United States Patent

[11] 3,590,173

| [72] | Inventor | Bernhardt Stahmer<br>1509 Chicago St., Omaha, Nebr. 68102 |
|---|---|---|
| [21] | Appl. No. | 751,290 |
| [22] | Filed | Aug. 8, 1968 |
| [45] | Patented | June 29, 1971 |

[54] BUS BAR HOUSING AND RUNWAY FOR ELECTRICAL COLLECTOR HEAD
16 Claims, 10 Drawing Figs.

[52] U.S. Cl. ..................................................... 191/35, 191/23 A
[51] Int. Cl. ..................................................... B60m 1/04
[50] Field of Search .......................................... 191/35, 23 A, 35; 174/97, 99 B

[56] References Cited
UNITED STATES PATENTS

| 1,481,693 | 1/1924 | Creech | 191/35 |
| 427,221 | 5/1890 | Boynton | 191/35 |
| 737,997 | 9/1903 | Burk | 174/97 |
| 2,341,841 | 2/1944 | Carlson | 174/99 (B) |
| 2,481,194 | 9/1949 | Bubb et al | 191/35 |
| 2,675,434 | 4/1954 | Herrmann | 191/23 (A) |
| 2,704,309 | 3/1955 | Ford et al | 191/35 |
| 2,820,084 | 1/1958 | Shaw | 191/23 (A) (UX) |
| 2,824,912 | 2/1958 | Taylor | 191/35 |
| 2,824,913 | 2/1958 | Taylor | 191/35 X |

FOREIGN PATENTS

| 699,098 | 1/1952 | Great Britain | 191/35 |

Primary Examiner—Arthur L. La Point
Assistant Examiner—George H. Libman
Attorney—George R. Nimmer ABSTRACT: This invention relates to an elongate bus bar housing and runway for the electrical collector head of a trolley system, wherein the collector head is adapted to travel along the elongate housing and runway and direct electrical energy externally from the electrified bus bar to an electrically motivatable trolleylike apparatus. The housing and runway of the present invention is constructed primarily of a resinous electrically insulative structural material and is in direct contact with the electrically conductive bus bar, the bus bar being longitudinally slidably and loosely disposed along the housing and runway, there being longitudinal runway means to allow the collector head to be supported by and traverse along said housing and runway.

INVENTOR
BERNHARDT STAHMER

BY George R Nimmer
ATTORNEY

INVENTOR
BERNHARDT STAHMER
BY George R. Nimmer
ATTORNEY

INVENTOR
BERNHARDT STAHMER
BY George K. Nimmer
ATTORNEY

BUS BAR HOUSING AND RUNWAY FOR ELECTRICAL COLLECTOR HEAD

Trolley systems of the prior art commonly comprise: an overhead bus bar or other elongate conductor source of electrical energy having an electrically insulative housing of inverted-U cross-sectional shape surrounding all but the lower side of the bus bar, together with a collector head adapted to reciprocate in parallelism along the elongate bus bar to direct electrical energy externally downwardly from the bus bar to an electrically motivatable trolleylike apparatus. However, there are the following several notable deficiencies in the prior art trolley systems, it being the objectives of the present invention to overcome each of the several prior art deficiencies:

First, the bus bar housings of the prior art are not readily adaptable to accommodate bus bars of different cross-sectional sizes; it is sometimes desireable to employ within the same bus bar housing bus bars of different cross-sectional sizes appropriate to the current voltages and amperages to be carried.

Second, most prior art bus bar housings of the inverted U-shaped cross section are intentionally provided of exceedingly resilient construction material and of exceedingly constricted dimensional size with respect to that of the bus bar to be housed in order to provide a secure frictional engagement between the bus bar and the U-shaped housing; however, when such prior art tight frictional engagements are to be utilized, it is difficult to install the bus bar within the intended housing, to remove a defective bus bar therefrom, and to substitute alternate size bus bars therewithin. Thirdly, prior art bus bar housings are not adapted to accommodate bus bars of more than one cross-sectional size or shape; it is oftentimes desireable, for example, to alternatively employ round or rectangular bus bars, and of various cross-sectional dimensional sizes, within the same electrically insulative housing.

Fourthly, prior art bus bar housings are of insufficient dielectric and structural characteristics to allow close parallel spacings of two or more bus bar housings; it is sometimes desireable in certain trolley systems to employ two or more parallel bus bar power sources in very close proximity to each other.

Fifthly, prior art bus bar housings are not normally intended to carry therealong the collector head portion of the trolley system, cumbersome and expensive I-beams and similar horizontal runways separate from and in parallelism with the housing being necessitated.

Sixthly, nearly all prior art bus bar housings are deficient in that they do not sufficiently dissipate the heat generated within the current carrying bus bar.

Seventhly, many prior art bus bar housings are difficult and cumbersome to removably attach immediately beneath a ceiling or similar overhead superstructure.

With the above and other objects and advantages in view, which will become more apparent as this description proceeds, the bus bar housing and runway for a collector head of the present invention comprises the novel configuration, combination, and arrangement of elements, reference being had to the accompanying drawing wherein like numbers refer to like parts in the several views, and in which.

Figure 1:
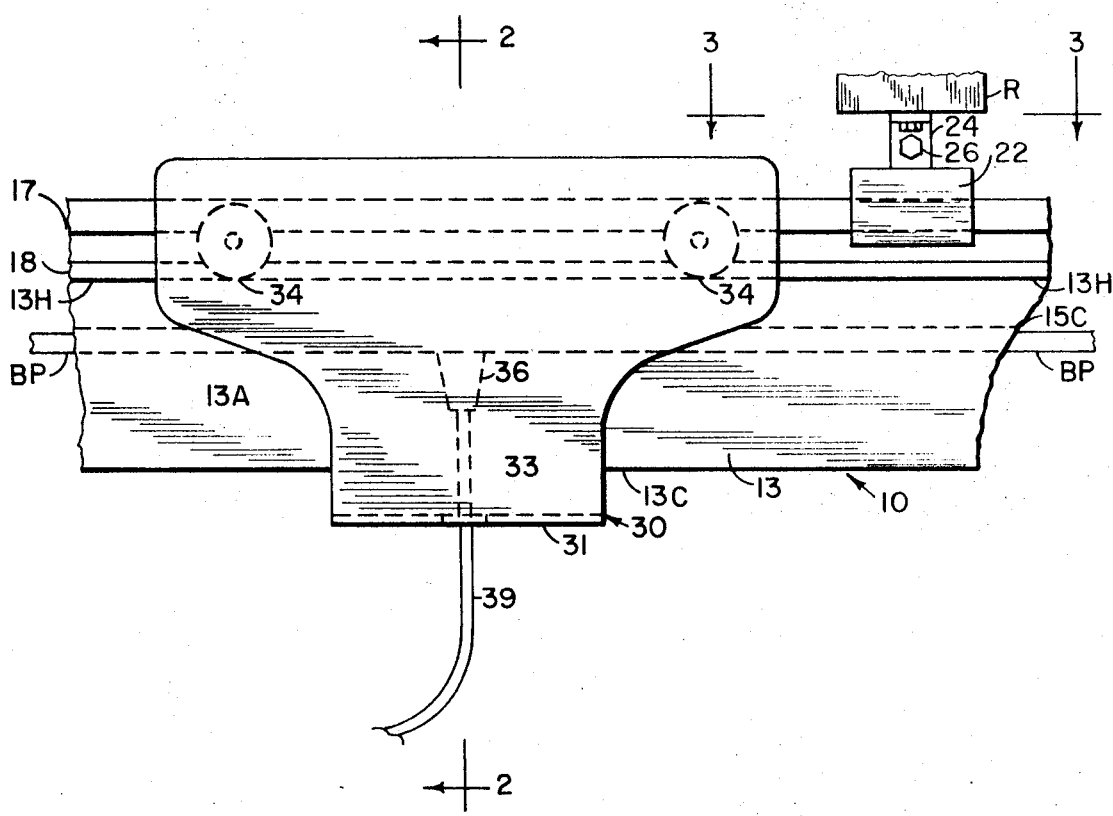
FIG. 1 is a side elevational view of a representative longitudinal segment of a bus bar housing and runway for collector head of the invention, attached to and located immediately horizontally below an overhead superstructure.
Figure 2:
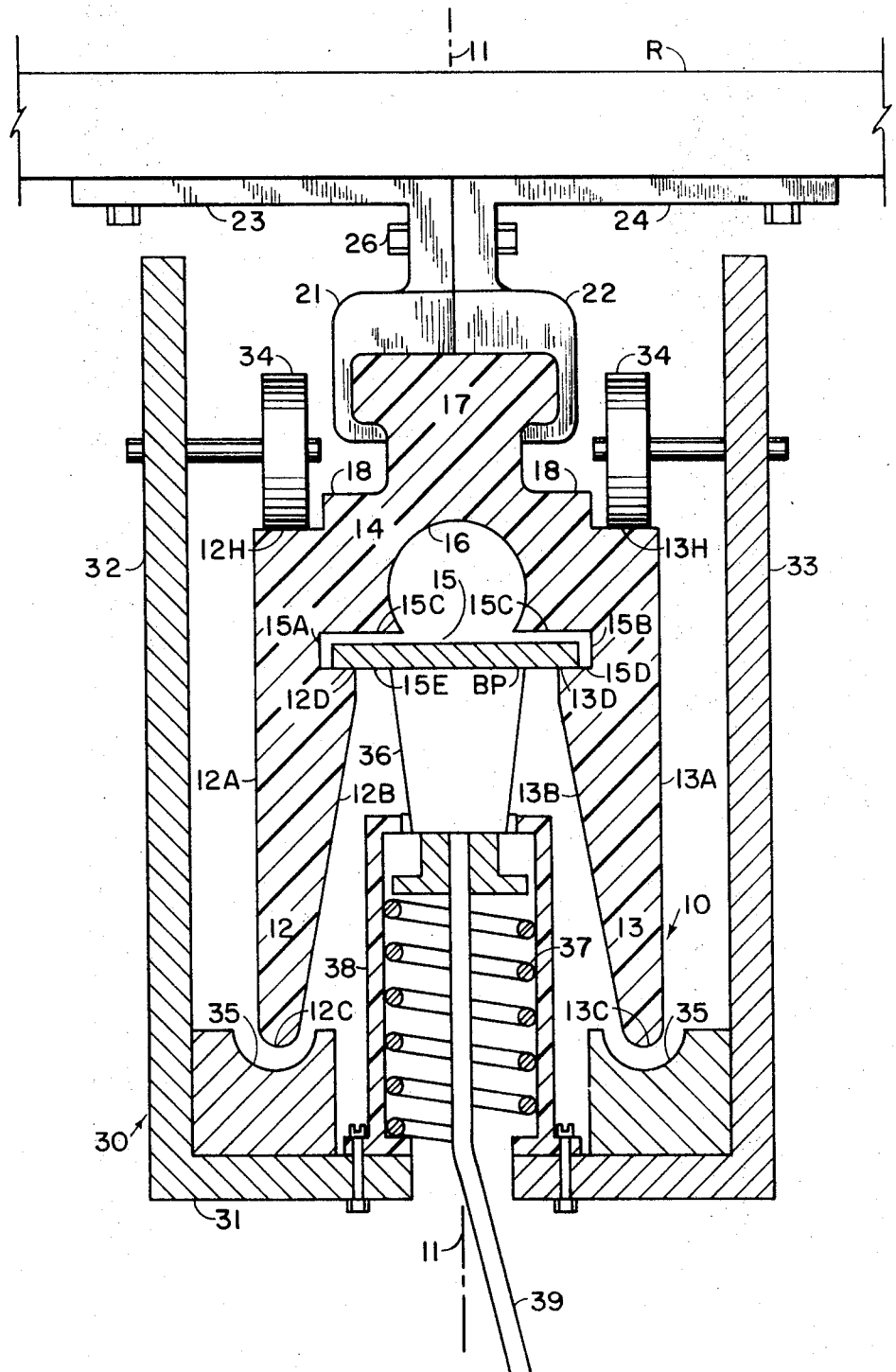
FIG. 2 is a sectional elevational view of the bus bar housing and runway for collector head taken along line 2-2 of FIGS. 1 and 3.
Figure 3:
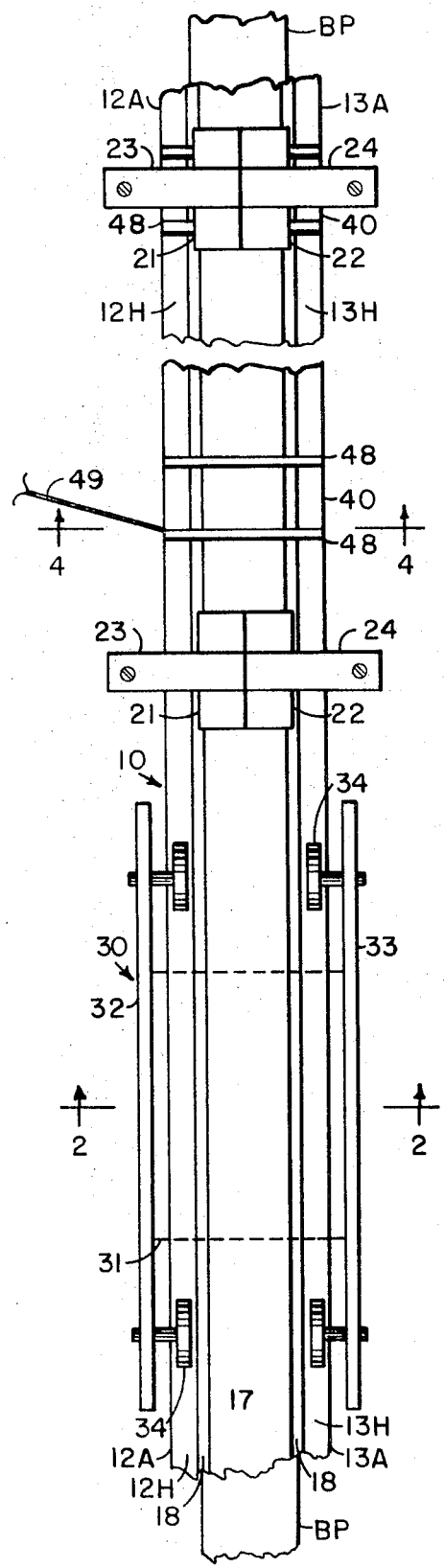
FIG. 3 is a sectional plan view of three longitudinally aligned segments of the bus bar housing and runway, and a collector head guided thereby, taken along line 3-3 of FIG. 1.

Referring initially to FIGS. 1—3, the elongate bus bar housing and runway for a collector head (sometimes hereinafter referred to simply as "housing-and-runway") of the present invention is of a substantially uniform downwradly furcate transverse cross-sectional shape along the elongate axis thereof, said fownwardly furcate shape being especially apparent in FIGS. 2 and 6—10. The housing-and-runway is adapted: to provide an electrically insulative housing (as indicated in the appropriate cross-hatching employed in FIGS. 2 and 6—10) for an overhead elongate electrically conductive bus bar e.g. bus bars "BP," "BC," "BL," and "BT"; to slidably maintain the bus bar in a substantially horizontal overhead position; and to provide an elongate runway for a rollable or other longitudinally movable collector head 30 along the length of the housing-and-guide whereby electrical energy might be directed externally downwardly from the bus bar through the collector head to an electrically motivatable trolleylike apparatus. As is readily apparent in FIG. 3, the typical housing-and-runway embodiment exemplified by FIGS. 1—3 is conveniently provided in finite length segments attached together in end-to-end relationship, as by suitable coupling means, e.g. 40, 48, 21—22, whereby the collector head 30 and the trolleylike apparatus therebelow (not shown) might travel back and forth along the consecutive string of housing-and-runway segments in electrically conductive contact with elongate bus bar e.g. BP, etc.

The uniform transverse cross-sectional shape of typical housing-and-runway embodiment 10 of FIGS. 1—3, and as shown particularly in FIG. 2, is substantially symmetrical about vertical axis 11 and is of a downwardly furcate shape including a plurality of downwardly extending legs, herein as a pair of downwardly extending legs disposed on opposite sides of vertical axis 11 including a first leg 12 and a second leg 13. Each of the respective legs has an outward side, including vertical planar outward side 12A of first leg 12 and vertical planar outward side 13A of second leg 13, disposed on opposite sides of axis 11. Moreover, each of the respective legs has a lower extremity preferably at common vertical elevation, including first leg lower extremity 12C and second leg lower extremity 13C, disposed on opposite sides of axis 11. Further, each of the respective legs has an inward side, including first leg inward side 12B having its lower terminous at 12C and an upper terminous at 12D and second leg inward side 13B having its lower terminous at 13C and an upper terminous at 13D. The entire inward sides of 12B and 13B of legs 12 and 13, respectively, are normally permanently disposed on opposite sides of axis 11 to accommodate between inward sides 12B and 13B the brush member portion 36 of collector head 30.

There is a transverse intervening web 14 disposed above legs upper terminii 12D—13D and spanning vertical axis 11 softening attaching legs 12 and 13, and in the preferred embodiment, housing-and-runway 10 is extruded of a resinous structural material, web 14 and legs 12—13 are in a uniphase structurally continuous relationship. The lower side of transverse web 14 is provided with a primary grooved portion 15 that is positioned above upper terminii 12D—13D of legs inward sides 12B—13B and that has a finite transverse width spanning vertical axis 11. The finite width of primary grooved portion 15 has a first transverse extremity or side 15A and a second transverse extremity or side 15B disposed on opposite sides of vertical axis 11, and specifically, groove first side 15A is disposed between upper terminus 12D and first leg outward side 12A while groove second side 15B is disposed between upper terminus 13D and second leg outward side 13A. Primary grooved portion 15 has a transverse upper side 15C and a transverse lower side 15D extending a finite distance outwardly from the respective upper terminii 12D—13D. Thus, primary grooved portion embodiment 14 is of a generally rectangular cross-sectional shape including a constricted opening 15E, interrupting lower side 15D, to permit access to the lower side of bus bar "BP" by the brush member portion 36 of collector head 30.

An elongate electrically conductive bus bar, herein as an elongate cuprous strap "BP," is shown horizontally supported within primary grooved portion 14 and supported in shelflike fashion across vertical axis 11 by legs 12 and 13, said bus bar "BP" resting upon the two outwardly extending surfaces 15D. As is evident in FIG. 2, and in the other transverse cross-sectional views of the drawing, the transverse cross-sectional shape of the elongate electrically conductive bus bar e.g. "BP," is similar to that of the housing-and-runway slotted portion e.g. 15, with the dimensional size of the bus bar being slightly less than the dimensions of the accommodating slot, whereby an exceedingly lengthy single bus bar might be conveniently slidably inserted through a consecutive end-to-end string of housing-and-runway segments 10.

As is shown in FIG. 2, the housing-and-runway transverse web portion might advantageously be provided with a secondary grooved portion 16 extending upwardly from the upper surface 15C of primary grooved portion 15. Secondary grooved portion 16 is preferably of a generally circular shape with the vertical diameter thereof being disposed along vertical axis 11, with the transverse diameter thereof being disposed above the upper transverse side 15C of primary grooved portion 15, and with the transverse width of secondary groove 16 being less than that for primary groove 15 whereby the periphery of the secondary groove 16 above its intersection with primary groove 15 comprises the major circumference of a circular shape. Thus, the secondary grooved portion 16 is adapted to slidably accommodate and horizontally support against its major periphery a circular type bus bar e.g. "BC," "BT," which will be described later in greater detail in connection with FIGS. 5—6 and 8. When such secondary grooved portion is included with the housing-and-runway of the present invention, such dually grooved housing-and-runways are adapted to readily alternatively employ and house elongate bus bars of more than one transverse cross-sectional shape, depending upon the exigiencies of the specific use condition. Moreover, if the bus bar is disposed within lower groove 15, upper groove 16 would facilitate removal of heat generated by the bus bar. Thus, the lower contour of the housing-and-runway extends between legs lower extremities 12C—13C, and through the underside slotted portion 15 or both slotted portions 15 and 16.

There are means for attaching an end-to-end consecutive string of housing-and-runway segments immediately below a building ceiling or similar overhead superstructure e.g. rafter "R," whereby the slidably housed bus bar is in overlying relationship to the electrically motivatable trolleylike apparatus, and preferably, the said attachment means includes a T-shaped protuberance 17 extending integrally upwardly from transverse web 14. The said overhead attachment means might also include a pair of molded cast-iron blocks 21 and 22 disposed on opposite transverse sides of T-shaped protuberance 17, said blocks 21 and 22 being removably attached together as with transverse nut-and-bolt fastener means 26 whereby housing-and-runway 10 is securely held between said blocks. Blocks 21 and 22 include at the upper end of each, transversely outwardly extending vertically perforate flanges 23 and 24, respectively, and blocks 21 and 22 are removably attached to an overhead rafter "R" as by means of threaded screws passing upwardly through perforate flanges 23 and 24. Several of such block-pairs 21 and 22 would be spaced at suitable increments along the upper side of the consecutive end-to-end string of housing-and-runway segments e.g. 10.

As has already previously alluded to, collector head 30 travels longitudinally along the consecutive end-to-end string of housing-and-runway segments 10 whereby said collector head directs electrical energy downwardly from the bus bar to an electrically motivatable trolleylike apparatus. The longitudinal runway portion of the housing-and-runway is disposed along the upper contour thereof, and in the FIGS. 1—3 embodiment, the runway portion is present as a pair of horizontal planar portions 12H—13H on the transverse web upper side, said runways 12H and 13H extending inwardly from legs outward sides 12A and 13A, respectively. Collector head 30 includes a pair of vertical members, herein as vertical panels 32 and 33 disposed transversely outwardly of legs 12 and 13, respectively. There is a transverse horizontal base panel 31 spanning vertical axis 11 and connected to vertical panels 32 and 33. Extending transversely inwardly from the upper portion of carrier head 30 is at least one rotatable wheel 34 engaged with the longitudinal runway portion of the housing-and-runway 10 whereby collector head 30 is adapted to rollably traverse along the length of said housing-and-runway segments 10. Specifically herein, the upper portion of each panel 32 and 33 is provided with two inwardly extending rotatable wheels 34 to provide a stably suspended rollable collector head 30.

There are guide means for controlling the transverse position of the carrier head 30 with respect to vertical axis 11 to prevent said carrier head from straying transversely off the runway portion of housing-and-runway 10. Such guide means might take the form of a special inward contour on the collector head itself, such as the inward contours at 35 adapted to slide along legs lower ends 12C—13C. Preferably, however, the guide means is synthetic the housing-and-runway itself, herein as a longitudinally extending upright shoulder 18 on respective sides of axis 11 at the inward terminus of the respective longitudinal runway portions 12H—13H.

Collector head 30 includes an upright electrically conductive brush member 36 resiliently urged in an upward direction by a spring means, such as coil spring 37 contained within vertical electrically insulative cylinder 38. An elongate electrically conductive wire or lead 39 is connected to brush member 36 whereby electrical current is adapted to be directed downwardly from the bus bar e.g. "BP," through brush member 36, downwardly through an opening of horizontal panel 31, and thence to the electrically motivatable trolleylike vehicle (not shown). The upper side of brush member 36 should have a similar contour to the underside of the bus bar, and in the case of the platelike bus bars "BP" and "BL" the brush member upper side would be substantially planar while in the case of circular bus bars "BC" and "BT" the brush member upper side would be appropriately concave.

Figure 4:
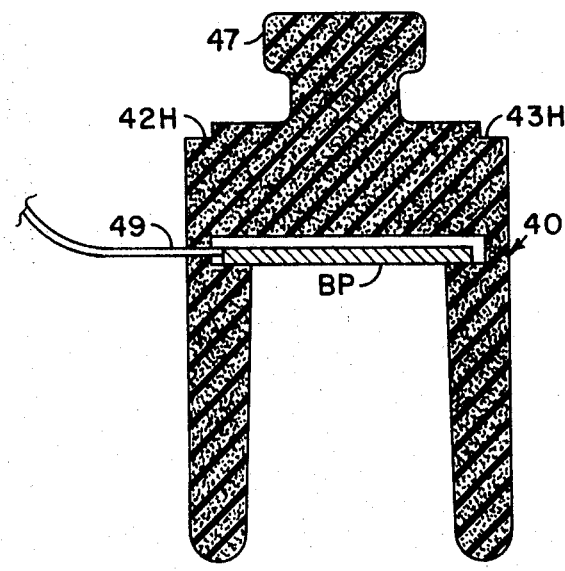
FIG. 4 is a sectional elevational view taken along line 4-4 of FIG. 3 to show in particular a longitudinally compressive gasket that might be used at the adjacent ends of longitudinally consecutive segments of the bus bar housing and runway, said resiliently compressive gasket also providing means for attaching a branch line conductor to the bus bar.

The end-to-end consecutive attachment of housing-and-runway segments can be accomplished in many ways. For example, the overhead attachment means i.e. blocks 21—22, might be secured at the end-to-end juncture of neighboring housing-and-runway segments. Or a layer of adhesive 48 might be employed at such end-to-end segment junctures. Preferably, however, especially when it is desired to have a branch-line electrical conductor 49 extending laterally outwardly from the bus bar, the longitudinally resiliently compressive gasket 40 of FIG. 4 might be advantageously employed. The gasket 40 is in its transverse cross-sectional shape substantially identical to that of the housing-and-runway employed therewith e.g. 10; however, the longitudinal length of the juncture gasket 40 would necessarily be of relatively short length compared to the segment length of the housing-and-runway. Owing to the inherently lower weight bearing capacity of the resiliently compressive structural material of gasket 40, its length should not exceed about 5 percent of the housing-and-runway segment. The resiliently compressive nature of gasket 40 allows it to conform around the laterally extending branch line conductor 49. The gasket 40, with its runway portions 42H and 43H in longitudinal registry or alignment with runway portions 12H and 13H of end-to-end segments 10 to provide an uninterrupted longitudinal runway for carrier head 30, might be joined with adhesive 48 to the two neighboring segments. Alternatively, such joinder may be accomplished with blocks 21—22, provided said blocks engage T-shaped protuberance 47 and are lengthier then said gasket 40 as illustrated in FIG. 3.

Figure 5:
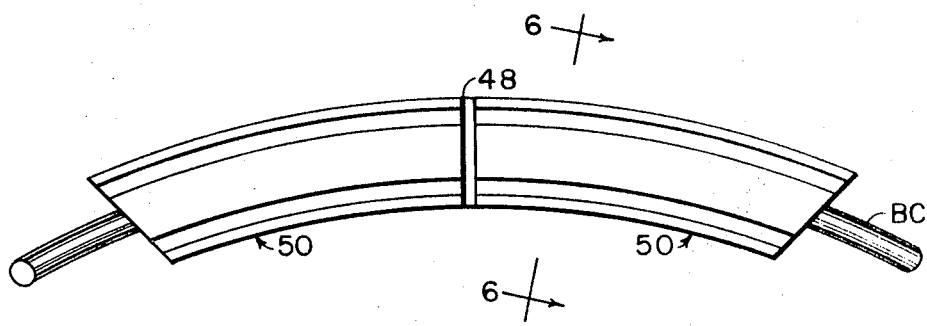
FIG. 5 is a top plan view of two longitudinally aligned alternate transversely curved embodiments of the bus bar housing and runway of the present invention.
Figure 6:
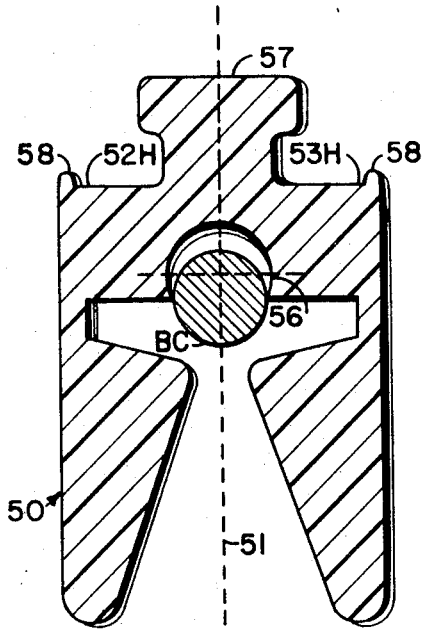
FIG. 6 is a sectional elevational view of the alternate bus bar housing and runway taken along line 6-6 of FIG. 5.

Having now described embodiment 10 of the bus bar housing-and-runway of FIGS. 1—3, other representative embodiments of the housing-and-runway segments will now be explained. FIGS. 5 and 6 show that one or more of the consecutive segments e.g. 50, might be transversely curved whereby the string of consecutive end-to-end segments might follow a desired nonlinear elongate path. With such transversely curved segments, it is desireable to employ as the bus bar a circular flexible cable "BC," whereby a single lengthy flexible cable might be fed through the whole string of circular grooved portions 56 commencing at one end of such consecutive segments string. As has been previously alluded to, the periphery of a circular grooved portion to slidably accommodate a circular bus bar comprises the major portion of a circular shape, and the diameter of the slidable circular bus bar should bear a ratio of about 50 percent—90 percent with respect to the horizontal diameter of the circular slot to horizontally maintain therewithin in slidable shelflike fashion the circular bus bar. In all other respects, the embodiment of FIGS. 5 and 6 is identical to that embodiment of FIGS. 1—3 and segments of each embodiment readily interchangeable in an end-to-end type arrangement alluded to in FIGS. 3 and 5.

Figure 7:
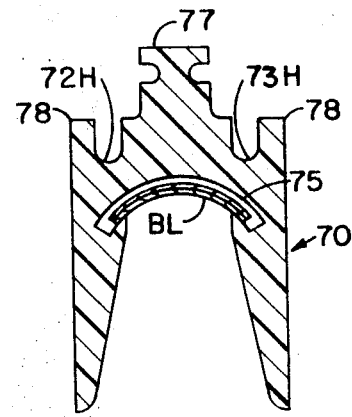
FIG. 7 is a sectional elevational view of another alternate embodiment of the bus bar housing and runway of the present invention and of an alternate type laminar bus bar that might be employed therewith.

The alternate embodiment 70 of FIG. 7 is adapted to slidably accommodate and maintain in shelflike fashion the laminar bus bar "BL." Laminar bus bar "BL" is of a dual-layer construction including a very thin high-resistance electrically conductive lower layer and an electrically insulated upper layer. If it were not for the electrically insulative upper layer, the very thin electrically conductive lower layer would likely be of insufficient structural strength to maintain itself across the lower opening of primary grooved portion 75 and would not bear well against brush member 36 of collector head 30. Upper surface 75C of primary grooved portion 75 might be of the rounded configuration shown, and in such event, at cross section of laminar bus bar "BL" is similarly rounded. Runway portions 72H and 73H are disposed at the bottom of a troughlike contour, the upright sides, e.g. 78, providing a means for guiding the collector head wheels 34.

Figure 9:
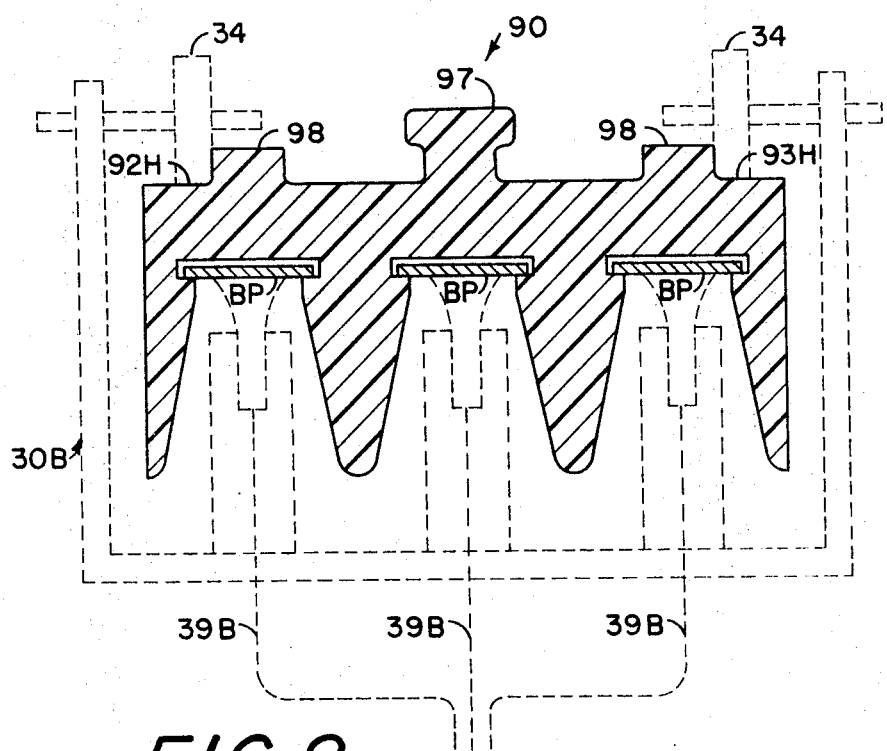
FIG. 9 is a sectional elevational view of a uniphase side-by-side parallel combination of three bus bar housing and runway adapted to be employed with multiconductor carrier heads.
Figure 8:
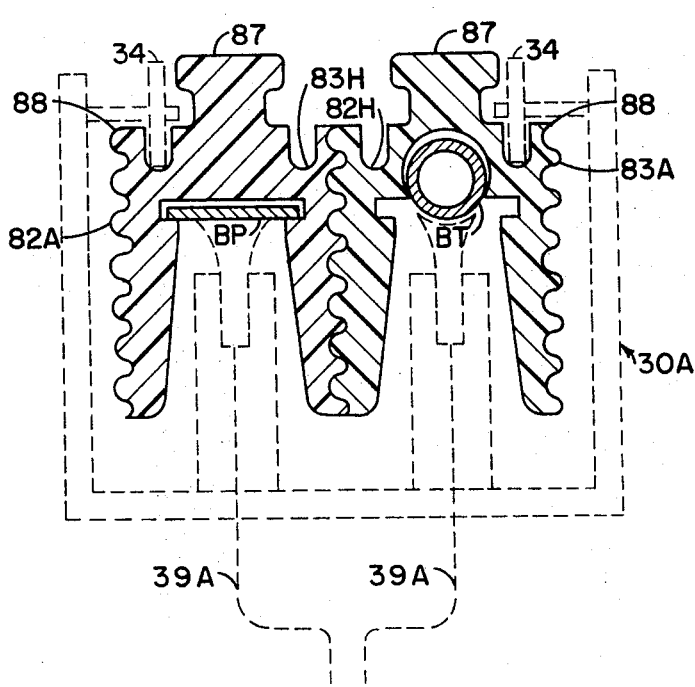
FIG. 8 is a sectional elevational view of yet another alternate embodiment of the bus bar housing and runway of the present invention that lends itself especially well to side-by-side parallel abutment with similar units when employed with multi-conductor carrier heads.

It will be seen that the bus bar housing and runways of FIGS. 2, 6, and 7 have upright sides e.g. 12A, 13A, whereby it is possible to abut two or more housing-and-runways in side-by-side parallel abutting relationship along the overlying superstructure. In this manner electrical current might be directed downwardly from one or more parallel bus bars to the electrically motivatable trolleylike apparatus. The bus bar housing-and-runways of FIGS. 8 and 9 are also adapted for side-by-side parallel positioning. For example, the FIG. 8 embodiments have scalloped upright sides 82A and 83A whereby a plurality of the housing-and-runways might be removably abutted together in side-by-side parallel relationship. The runways 82H and 83H of the FIG. 8 embodiments are of the troughlike configuration as in FIG. 7 (72H and 73H including ridges 78). Attachment of the FIG. 8 embodiment is accomplished by means of the T-shaped protuberance 87 on each unit, similarly as with protuberances 17, 57, 77, 97, and 107. The leftward unit of FIG. 8 has a rectangular primary slotted portion adapted to slidably accommodate a rectangular bus bar "BP" whereas the rightward unit of FIG. 8 has a circular primary slotted portion adapted to slidably accommodate a circular solid bus bar "BC," or a tubular high-resistance bus bar "BT." With such circular bus bars, the upper surface of the brush member component of a collector head 30 should be appropriately concavely rounded as shown.

FIG. 9 demonstrates that two or more housing-and-runway structures might be extruded in one integral structurally continuous relationship and embodiment 90 does include three housing-and-runway structures. When such integral units are employed, only one overhead attachment means e.g. 97, is required. The wheels 34 of the tribrush collector head are guided by shoulders 98 disposed at the inner extremities of runways 92H and 93H.

Figure 10:
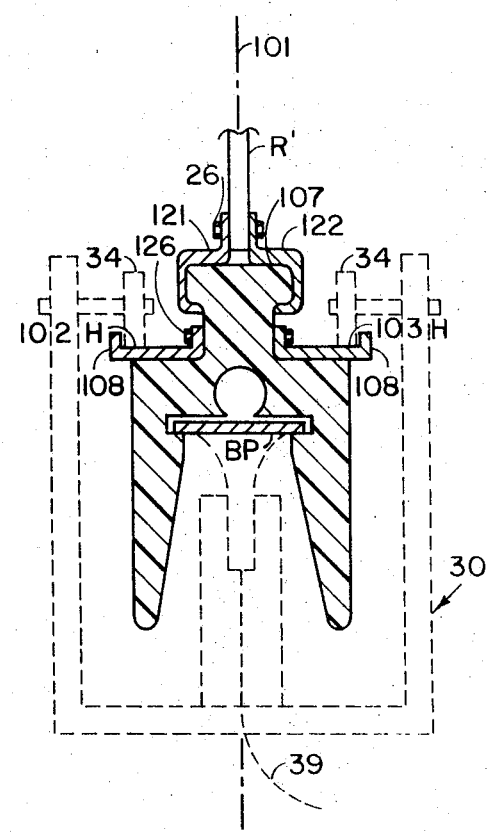
FIG. 10 is a sectional elevational view of a further alternate embodiment of the bus bar housing and runway of the present invention.

It is economically desireable to extrude the entire housing-and-runway, including the elongate runway portions and the collector head guide means, from a resinous structural material of high compressive strength to provide an electrically insulative housing for the slidably disposed uninsulated bus bar together with a runway suspension support for the collector head. While it is essential that the downwardly extending legs and the intervening web portions of the housing-and-run way device be provided of an electrically insulative material, FIG. 10 demonstrates that the elongate runway portion might be provided of an electrically conductive metallic structural material. Specifically, the housing-and-runway embodiment 100 of FIG. 10 is in all respects identical to embodiment 10 of FIGS. 1—3 except at the runway portion. The runway portions 102H and 103H of embodiment 100 are provided by a pair of substantially parallel horizontal elongate channel irons disposed along opposite sides of vertical axis 101, said channel irons being attached together by means of bolt 126 passing transversely through the necked portion of T-shaped protuberance 107. Upwardly extending outward ridges 108 of the respective channel irons provide guide means for the rollable wheels 34 of collector head 30. The overhead attachment blocks 121—122 are similar to attachment blocks 21—22 except that they lack horizontally flanged portions 23—24, said flangless blocks 121—122 being appropriate to relatively thin vertical rafter $R^1$.

From the foregoing, the construction and operation of the bus bar housing-and-runway will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. An elongate bus bar housing and runway for a collector head of a trolley system comprising an overhead elongate horizontal bus bar electrical conductor and a collector head adapted to traverse horizontally along said bus bar and conduct electrical energy downwardly therefrom to an electrically motivated trolleylike apparatus, said elongate bus bar housing-and-runway for a collector head being a finite length elongate segment and having a substantially uniform transverse cross-sectional shape along the elongate axis thereof and comprising: a vertical axis; a pair of downwardly extending opposed legs disposed on opposite sides of said vertical axis and including a first leg and a second leg, each of said two legs having an outward side with the said outward side of the respective legs being disposed on opposite sides of said vertical axis, each of said two legs having a lower extremity with the said lower extremity of the respective legs being disposed on opposite sides of said vertical axis, each of said two legs having an electrically insulated inward side with the said inward side of the respective legs being disposed a finite distance apart on opposite sides of the vertical axis to accommodate between the legs the electrically conductive portion of a collector head, the inward side of the first leg having an upper terminus and a lower terminus at the first leg lower extremity, the inward side of the second leg having an upper terminus and a lower terminus at the second leg lower extremity; a transverse intervening web spanning the vertical axis attaching the first and second legs together, said transverse web being disposed above the upper terminii of the inward sides of the first and second legs, the lower side of said transverse web being provided with a primary grooved portion intersecting the vertical axis and having a finite transverse width including a first groove side offset transversely outwardly from the upper terminus of the first leg inward side and including a second groove side offset transversely outwardly from the upper terminus of the second leg inward side whereby the grooved portion is constricted along its lower transverse side to longitudinally slidably accommodate and horizontally support in shelflike fashion an elongate bus bar loosely disposed along said grooved portion, the said two legs and intervening web being provided of a structurally continuous resinous material of sufficient compressive strength to support the bus bar in said shelflike fashion, the said transversely grooved lower side of the intervening transverse web together with the inward sides of said legs providing the lower contour of said transverse cross-sectional shape; and the remaining upper contour of said transverse cross-sectional shape being provided with at least one elongate runway at substantially constant vertical elevation along the elongate length of the housing and at a constant transverse distance from the housing vertical axis, said elongate runway also providing a means for suspending the longitudinally movable collector head downwardly from the elongate bus bar housing segment.

2. The bus bar housing-and-runway of claim 1 wherein the housing transverse cross-sectional shape is substantially symmetrical about the housing vertical axis; wherein the lower terminii of the respective legs are of substantially common elevation; wherein the height of each leg inward side between the upper and lower terminii thereof exceeds the finite transverse width of the slotted portion; and wherein the runway comprises two substantially parallel wheel-tracks disposed along the upper side of the transverse web along opposite sides of the vertical axis.

3. The bus bar housing-and-runway of claim 2 wherein the transverse web is provided with a secondary grooved portion extending upwardly from the primary grooved portion, said secondary grooved portion being of substantially circular shape and having the said vertical axis as the vertical diameter thereof, the transverse horizontal diameter of said secondary grooved portion being disposed above the upper transverse side of the primary grooved portion and being transversely narrower than the finite transverse width of the primary grooved portion whereby the periphery of said secondary grooved portion above its intersection with the primary grooved portion comprises the major circumference of a circular shape.

4. The bus bar housing and runway of claim 3 wherein the segment is curved in a transverse direction.

5. The bus bar housing and runway of claim 1 longitudinally in slidably engaged combination with an elongate horizontal electrically conductive bus bar of substantially uniform circular transverse cross-sectional shape along the length of said bus bar; wherein the housing grooved portion is of substantially circular transverse cross-sectional shape and having the said vertical axis as the vertical diameter thereof, the transverse horizontal diameter of said housing grooved portion being disposed above the upper terminii of the first and second legs whereby the periphery of said housing grooved portion is the major circumference of a circular shape; wherein the diameter of the bus bar bears a ratio of 0.5—0.9 with respect to the horizontal diameter of the housing grooved portion whereby the bus bar is slidably disposed along the housing grooved portion; and wherein the length of said bus bar exceeds the length of any one elongate segment of the bus bar housing and runway.

6. The bus bar housing and runway of claim 5 wherein the electrically conductive bus bar comprises a flexible cable.

7. A plurality of the bus bar housing and runway segments of claim 6 assembled together in end-to-end relationship to provide a consecutive horizontal string of said segments with the runway and the housing elongate grooved portion of consecutive segments being aligned, said consecutive string being attached to and located immediately below a horizontal overhead superstructure, said electrically conductive flexible bus bar being of a single continuous length slidably disposed within said consecutive string.

8. The assembly of claim 7 wherein there is a longitudinally resiliently compressive gasket disposed between adjacent ends of the consecutive segments, the resiliently compressive gasket having a transverse cross-sectional shape similar to that of the housing and runway segments; wherein the attachment means between the string of consecutive segments and the overhead superstructure is disposed along and is lengthier than the said resiliently compressive gasket; wherein there is a branch-line conductor attached to the bus bar between the end of one segment and the resiliently compressive gasket, said branch-line conductor extending laterally of the consecutive string of housing and runway segments; and wherein at least one of the housing and runway segments is curved in the transverse direction.

9. The assembly of claim 8 wherein there is a collector head suspended from and located below a bus bar housing and runway of said consecutive string assembly, said downwardly suspended collector head being engaged with the continuous elongate track means whereby the collector head is adapted to traverse along the bus bar housing and runway, guide means for controlling the transverse position of the carrier head with respect to the vertical axis of the bus bar housing-and-runway, said collector head including an upright electrically conductive brush member resiliently urged in the upward direction against said electrically conductive bus bar, an elongate electrically conductive leader attached to and extending downwardly from the brush member toward the electrically motivated trolleylike apparatus, said brush member and leader being electrically isolated from the collector head.

10. A plurality of the bus bar housing and runway segments of claim 1 assembled together in end-to-end relationship to provide a consecutive horizontal string of said segments, with the runway and the primary slotted portions respectively of the consecutive segments being in longitudinal registry, said consecutive string being attached to and located immediately below an overhead superstructure, said electrically conductive bus bar being of a single continuous length longer than that of any one segment and slidably disposed within the primary slotted portion of said continuous string.

11. The assembly of claim 10 wherein there is a longitudinally resiliently compressive gasket disposed between and adherently attached to adjacent ends of the consecutive segments, the said gasket having a transverse cross-sectional shape similar to that of the adjoining housing and guide segments.

12. The assembly of claim 11 wherein the elongate horizontal bus bar is of a dual-layer laminar construction including an electrically conductive lower side and an electrically insulative upper side.

13. The bus bar housing and runway of claim 1 wherein the said remaining upper contour of said cross-sectional shape includes guide means for controlling the transverse position of the carrier head with respect to the vertical axis of the bus bar housing and runway.

14. The bus bar housing and runway of claim 13 wherein there is a T-shaped integral protuberance extending upwardly from the transverse web along the vertical axis for facilitating attachment of the housing and runway to an overhead superstructure; wherein there is a pair of elongate runways positioned along opposite sides of said T-shaped protuberance; and wherein the guide means comprises a longitudinally shouldered contour at the upper surface of said transverse web.

15. The bus bar housing and runway of claim 14 wherein the entire transverse cross section thereof including the two legs, the intervening web, the runways, and the guide means are provided of a resinous electrically insulative structural material.

16. An elongate bus bar housing and runway for a collector head of a trolley system comprising an overhead elongate horizontal bus bar electrical conductor and a collector head adapted to traverse longitudinally along said bus bar housing and runway and to conduct electrical energy downwardly therefrom to an electrically motivated trolleylike apparatus, said elongate bus bar housing and runway for a collector head having a substantially uniform transverse cross-sectional shape along the elongate axis thereof and comprising: a vertical axis; a pair of downwardly extending opposed legs disposed on opposite sides of said vertical axis and including a first leg and a second leg, each of said two legs having an outward side with the said outward side of the respective legs being disposed on opposite sides of said vertical axis, each of said two legs having a lower extremity with the lower extremity of the respective legs being disposed on opposite sides of the vertical axis, each of said two legs having an electrically insulated inward side with the said inward side of the respective legs being disposed a finite distance apart on opposite sides of the vertical axis to accommodate between the legs the electrically conductive portion of a collector head, the inward side of the first leg having an upper terminus and also a lower terminus at the first leg lower extremity, the inward side of the second leg having an upper terminus and a lower terminus at the second leg lower extremity; a transverse intervening web spanning the vertical axis so as to attach the first and second legs together, said transverse web being disposed above the upper terminii of the inward sides of the first and second legs, the lower side of said transverse web being provided with a primary grooved portion of substantially uniform cross-sectional shape extending along the said elongate axis, the upper side of said transverse web portion being provided with at least one elongate runway in substantial parallelism with the said elongate axis and at a constant transverse distance from the housing vertical axis, said elongate runway also providing a means for suspending a longitudinally movable collector head downwardly from the elongate bus bar housing and runway; an elongate flexible electrically conductive bus bar having a substantially uniform cross-sectional transverse size and shape, said elongate bus bar loosely disposed in longitudinally slidable shelflike fashion within the primary grooved portion of the transverse web, the said two legs and intervening web including the elongate runway being provided of a structurally continuous flexible resinous material of sufficient compressive strength to support the bus bar in said horizontal shelflike fashion.